United States Patent [19]
Snyder et al.

[11] Patent Number: 5,115,902
[45] Date of Patent: May 26, 1992

[54] LANE DIVIDER

[75] Inventors: Gene W. Snyder, Minneapolis; Peter N.Y. Pan, Minnetonka, both of Minn.

[73] Assignee: Thiele Engineering Company, Minneapolis, Minn.

[21] Appl. No.: 633,325

[22] Filed: Dec. 24, 1990

[51] Int. Cl.⁵ .............................................. B65G 47/46
[52] U.S. Cl. ...................................... 198/365; 198/440
[58] Field of Search ................................ 198/365, 440

[56] References Cited

U.S. PATENT DOCUMENTS

| | | | |
|---|---|---|---|
| 3,009,572 | 11/1961 | Seaborn | 198/365 |
| 3,093,245 | 6/1963 | Worcester et al. | 198/365 X |
| 3,190,432 | 6/1965 | Vanderhoof | 198/365 X |
| 3,731,782 | 5/1973 | Del Rosso | 198/365 |
| 3,735,867 | 5/1973 | Vanderhoof et al. | 198/365 X |
| 3,986,596 | 10/1976 | Hamilton | 198/365 |
| 3,987,888 | 10/1976 | Wickam | 198/365 X |
| 4,138,008 | 2/1979 | Del Rosso | 198/365 |
| 4,508,206 | 4/1985 | Moore et al. | 198/365 |
| 4,637,508 | 1/1987 | Kikuchi et al. | 198/365 |
| 4,817,779 | 4/1989 | Beck et al. | 198/365 |
| 4,941,561 | 7/1990 | Yamabe et al. | 198/365 |
| 4,946,022 | 8/1990 | Davis et al. | 198/365 |
| 4,984,675 | 1/1991 | Yamabe et al. | 198/365 |

FOREIGN PATENT DOCUMENTS

| | | | |
|---|---|---|---|
| 2912298 | 12/1979 | Fed. Rep. of Germany | 198/440 |
| 3538875 | 5/1986 | Fed. Rep. of Germany | 198/365 |
| 0151524 | 9/1982 | Japan | 198/365 |

*Primary Examiner*—D. Glenn Dayoan
*Attorney, Agent, or Firm*—Hugh D. Jaeger

[57] ABSTRACT

Lane divider for conveyor systems which converts from one product path to multiple paths or from multiple paths to a single path. The lane divider system separates a product trail into discrete paths with automatic control for the flow of product.

5 Claims, 4 Drawing Sheets

LANE DIVIDER

BACKGROUND OF THE INVENTION

1. Field of the Invention

The present invention relates to conveyor systems, which convert from one product path to multiple paths or from multiple paths to a single path.

2. Description of the Prior Art

In the prior art, many attempts have been made to modify conveyor systems to separate a flow of product into multiple lines for packaging purposes. Devices such as deflectors to steer product in mobile class have not proven effective. What is needed is a simple, well-controlled system for dividing product into separate lanes, such as for packaging.

The present invention addresses the need for a machine to separate a product trail into discrete paths with automatic control for the flow of product.

SUMMARY OF THE INVENTION

The present invention relates to a lane divider which includes pallets for carrying product, multiple tracks for guiding pallets on multiple paths, return rails for directing the pallets back after unloading product, and diverter means for selecting which track each pallet shall follow. In the preferred embodiment, tracks are of a rectangular cross section having a slot for guiding pallets. Each pallet has a projecting lug, which rides in the slot and allows the pallet to follow a proper lane. The pallets are preferably mounted for free transverse movement on rods.

The rods are mounted in conveyor fashion, having each end mounted on chain drives to move the rods; and therefore, the pallets through the system. The pallets continually circle through the system on the rod and chain apparatus, while their particular path of the system is selected by diverter means which guides the pallet to on of the multiple tracks.

DETAILED DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 3:
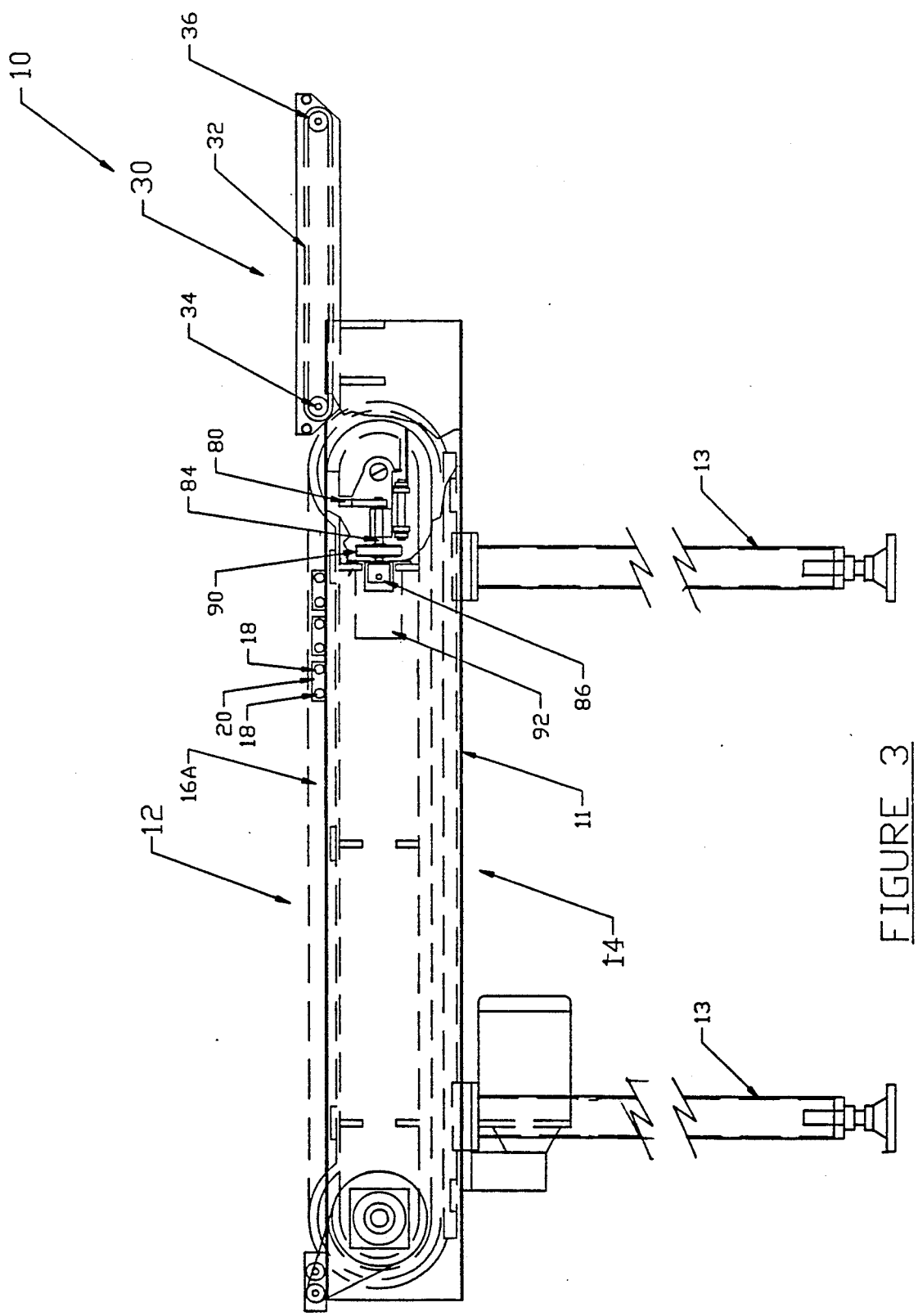
FIG. 3 is a side elevational view of the apparatus of FIG. 1.

A lane divider 10 constructed according to the present invention includes a frame 11 with a top side 12. Frame is supported by legs 13 mounted on a bottom side 14 as illustrated in FIG. 3. Mounted in frame 11 is conveyor apparatus 15. Conveyor apparatus 15 consists of two-side drive means 16a and 16b, which are preferably chain drives, for continuously moving in a cyclic path around frame 11.

Mounted transversely between drive means 16a and 16b is a series of conveyor rods 18. While it is understood that the entire drive means 16a and 16b is filled with conveyor rods 18, only a few are illustrated in the present example. The remainder of the conveyor rods are deleted for clarity of understanding other parts of the drawing. Mounted on conveyor rods 18 are pallets 20. These pallets 20, or platforms, are used to convey goods from a first end 21a to a second end 21b of system 10.

Figure 4:
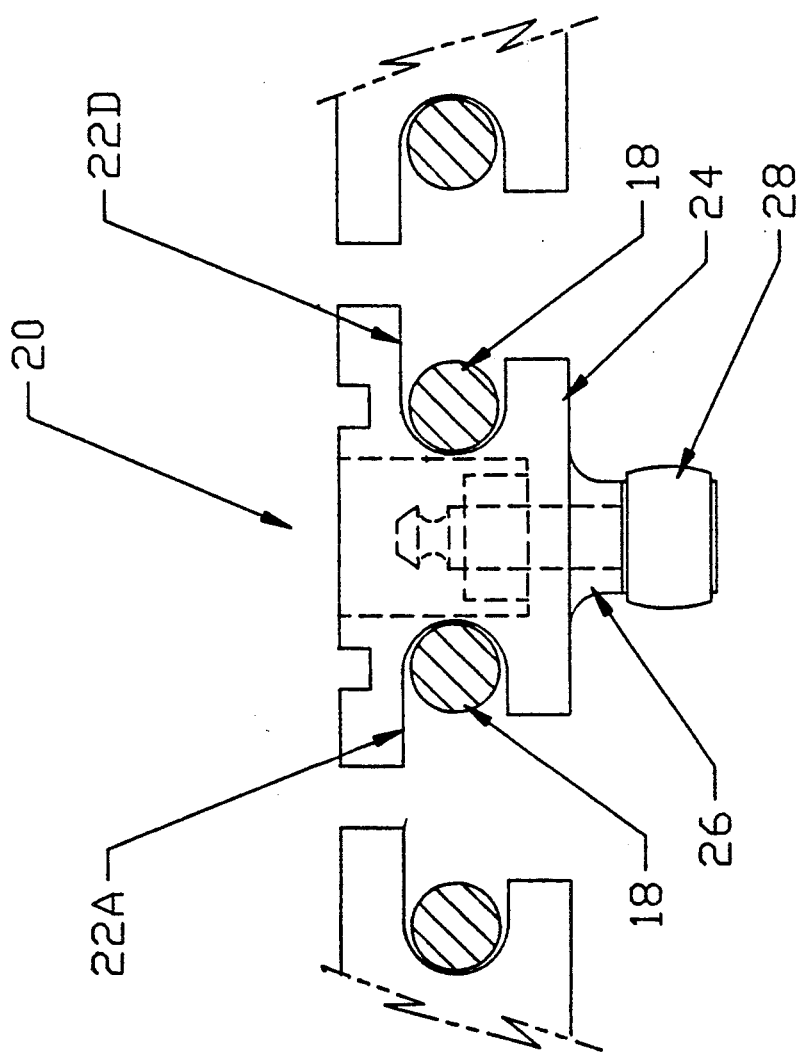
FIG. 4 is a cross-sectional view of a pallet employed in the system of FIG. 1.

Detail of pallet 20 is illustrated in FIG. 4. Pallet 20 is a block of material, such as plastic, which is slidably mounted on the conveyor rods 18. The pallets 20 have longitudinal grooves 22a and 22b on opposite sides of pallet 20 which slide over rods 18. With this mounting technique, pallet 20 is free to slide transversely on the rods 18 across the entire width of system 10.

Descending downwardly from a lower surface 24 of pallet 20 is a lug 26, which has an enlarged cam follower portion 28 at its distal end as illustrated in FIG. 4. As illustrated later, cam follower 28 is used by the system to control transverse motion of pallets 20 within system 10.

Drive means 16a-16b continuously moves on sprockets so that pairs of conveyor rods 18 are continuously cycling from first end 21a over the top side 12 to second end 21b, and back along bottom side 14. Each pair of rods 18 carries with it one pallet 20 for carrying product through the system 10. Pallets 20, in the illustrated embodiment, move from first end 21a to second end 21b along the top side 12 of the system 10. At the second end 21b of system 10, pallets 20, since they are mounted on drive means 16a-16b, follow down and return in an upside down path along the bottom side 14 of system 10 until they reach the first end 21a of their travel, at which time they once again move upward to the top side 12 for another cycle through system 10.

Product is provided to pallets 20 by a feed conveyor 30, which includes conveyor belt 32 moving on cylindrical drives 34 and 36. Conveyor belt 32 moves product provided to system 10 up to the point where product is dumped onto successive pallets 20 as they emerge from underneath system 10. Feed conveyor 30 may be any conventional conveyor system known in the prior art for feeding a stream of product to system 10.

The present invention moves pallets 20 into multiple paths by lane means 50. The lane means 50 includes, in the illustrated embodiment, four tracks 52a-52d. Each track 52a-52d is constructed of a right rail 54 and a left rail 56. The resulting cross section of a track 52 is therefore generally like a square having a slot 58 longitudinally extending the length of each track 52.

Figure 1:
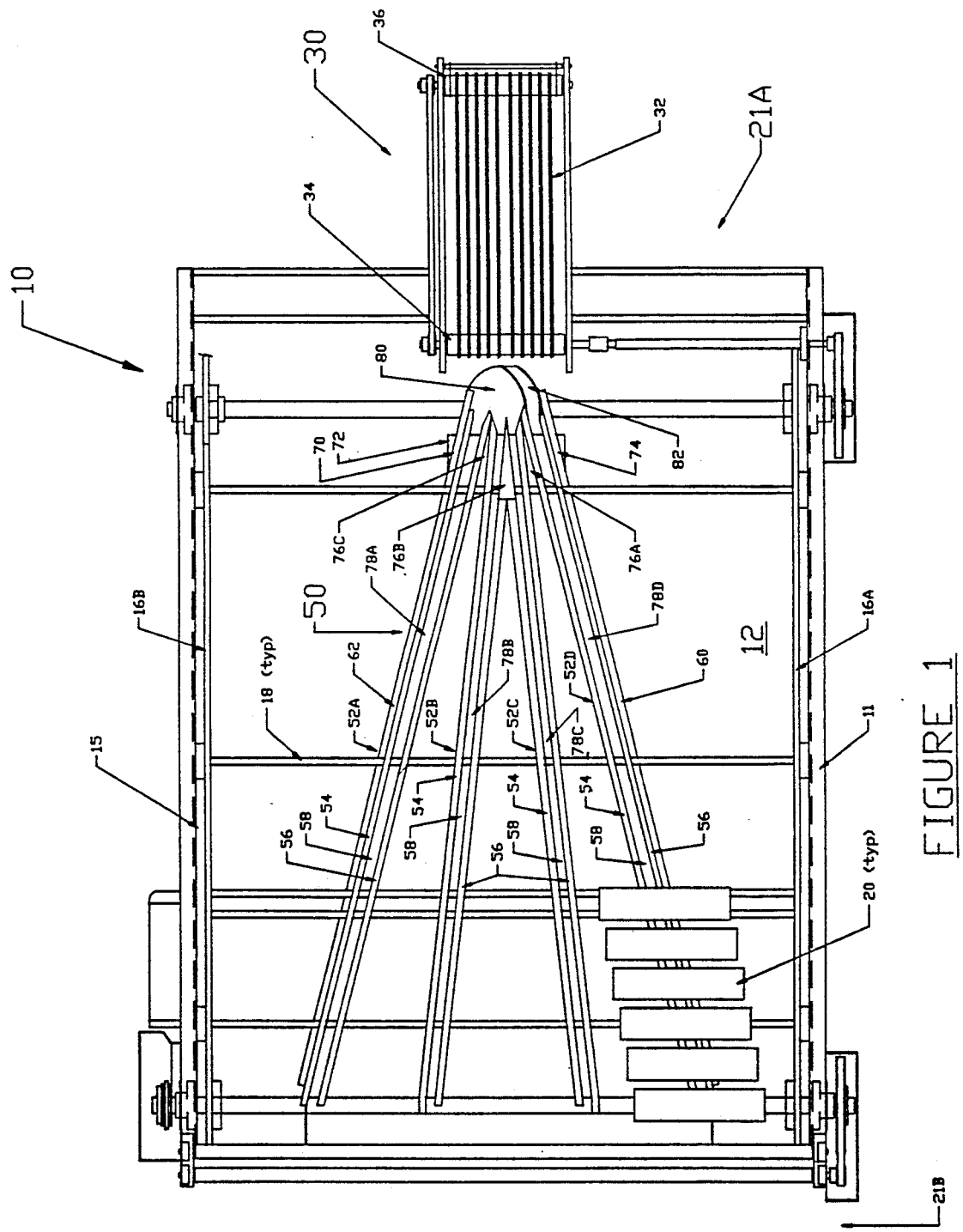
FIG. 1 is a top plan view of the apparatus of the present invention with most pallets and rods removed for clarity.

When moving through system 10, cam follower 28 of pallet 20 rides in track 52 along slot 58. In operation, a pallet 20 will follow a track 52 from first end 21a to second end 21b in FIG. 1 until it reaches the left hand end of slot 58 near the second end 21b. Pallet 20 then exits tracks 52 and drops down, as controlled by drive means 16a-16b to the bottom side 14 of the system 10 for return.

On bottom side 14 are mounted left cam rail 60 and right cam rail 62, which funnel or direct all pallets 20 to the center of system 10 on their return along the bottom side 14 of system 10 below the lane means 50. Cam rails 60 and 62 are preferably bars which urge or cause the cam followers 28 of pallets 20 to move inwardly like a funnel to return all pallets 20 to the center of system 10 at the first end 21a.

Pallets 20 are sorted into selected tracks 52 by pallet guide 70 which has side members 72 and 74 forming the outer guides for contact with cam followers 28 of pallets 20. Within pallet guide 70 are three pointed finger-like dividers 76a, 76b and 76c, which direct cam followers 28. The three dividers 76 form four pallet paths 78a, 78b, 78c, and 78d.

Paths 78a-78d are selected by moveable pallet director 80. Pallet director 80 has a generally semicircular pallet path 82. Moveable pallet director 80 is mounted so that the pallet path 82 receives cam followers 28 of pallets 20 at the bottom side 14 of system 10 from cam rails 60 and 62. As cam followers 28 ride through pallet director 80, through pallet path 82, they are directed upwards to the top side 11 of system 10 to one end of the pallet paths 78a-78d. Pallet director 80 is mounted for movement between four positions so that the upper end of pallet path 82 will be aligned at selected pallet paths 78a-78d. By moving pallet director 80, any of the paths 78a-78d, and therefore tracks 52a-52d in the corresponding tracks, may be selected.

Figure 2:
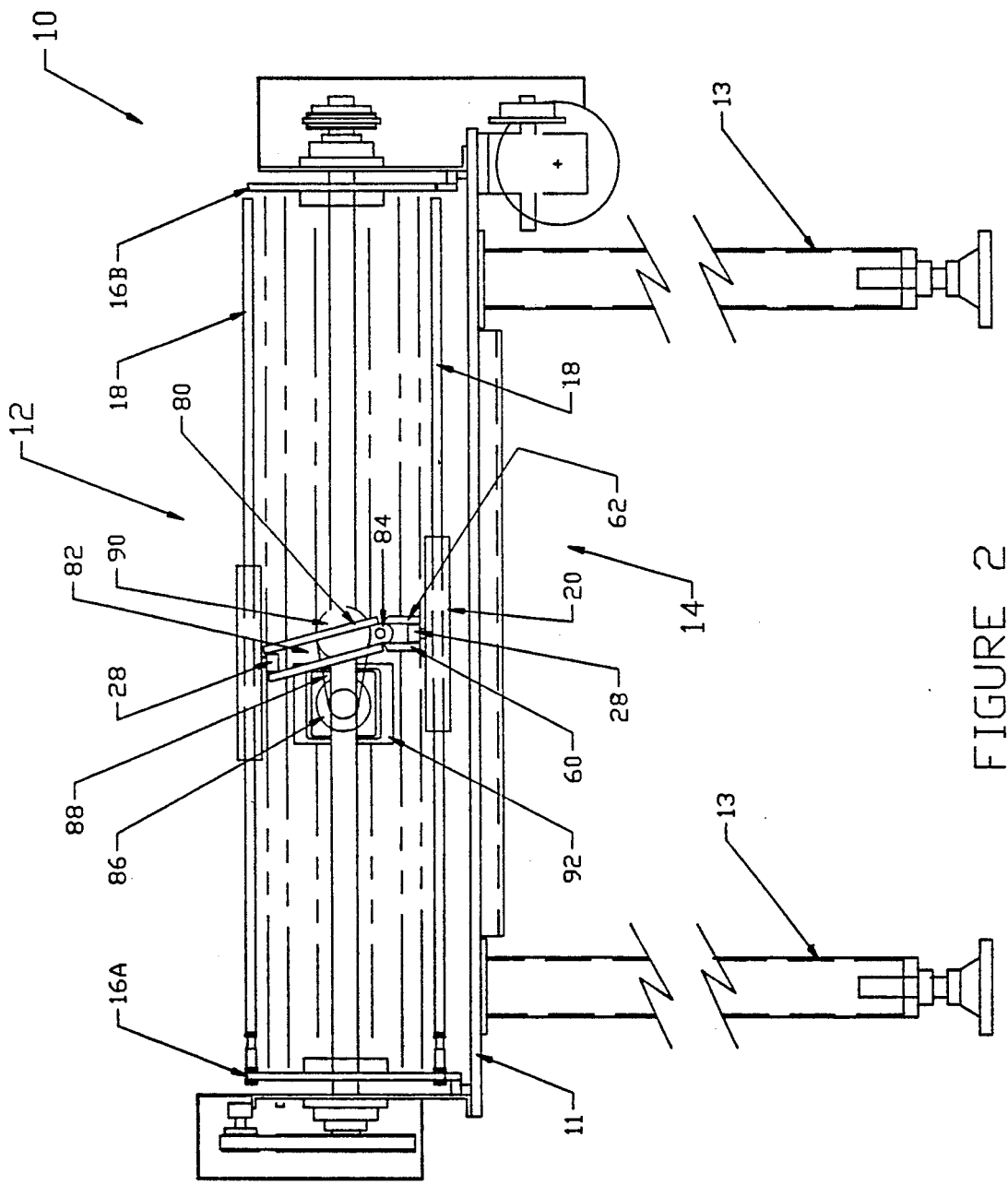
FIG. 2 is an end elevational view of the apparatus of FIG. 1.

As shown in FIG. 2, pallet director 80 is pivotally mounted at 84. A stepper motor 86 has a belt drive 88 to a cammed disk 90. Stepper motor 86 drives the belt 88 to rotate the disk 90 which moves the pallet director 80 between its four positions. Other selection means may be selected by those of skill in the art. Stepper motor 86 preferably has control means 92 which allows selection of paths 78a-78d in any order or combination. In the preferred embodiment, the stepper motor 86 is programmed to operate in a pattern of a, c, b, d, a, c, b, d, etc. with regard to pallet paths 78a-78d and tracks 52a-52d. Those skilled in the art can create an embodiment of system 10 programmable to particular paths or combinations for other applications. For example, the frequency of lane selection may be modified. The product stream may be unequally divided, such as a, b, a, c, a, d, etc. Those skilled in the art may vary both the amount of product on each line and the order of the lane selection.

Note that those skilled in the art may run this system in reverse and use the principles of the present invention to reduce multiple paths to a single path.

In operation, feed conveyor 30 provides a single stream of product on conveyor belt 32. Pallets 20 are continuously moving through system 10. The pallet director 80 is programmed to provide a pattern of path selection. As a pallet 20 rises from bottom side 14, its cam follower 28 is funnelled by cam rails 60 and 62 to the bottom of pallet director 80. The cam follower 28 then rides in path 82, up pallet director 80, to the top side 12 of system 10. The stepper motor 86 positions the pallet director 80 to the selected path 78a-78d. As the pallet 20 rises to the top of pallet divider 80, product is dumped from conveyor belt 32 onto pallet 20. The pallet 20 then proceeds through the selected path 78a, 78b, 78c or 78d in the selected track 52a-52d. As the drive means 16a-16b moves the pallet 20 through the system, the cam follower 28 follows the selected slot 58 in its track 52a-52d. Tracks 52a-52d direct the pallet 20 to its correct transverse position at the second end 21b of system 10.

At the second end 21b of system 10, product is dumped from pallet 20 as pallet 20 descends to the bottom side 14 of system 10. As drive means 16a-16b moves the pallet 20 back through system 10, return rails 60 and 62 urge or direct the cam follower 28 back to the center of system 10 where it can once again be engaged by the bottom of pallet director 80. As is shown by this embodiment, one skilled in the art can achieve various conversions of lanes from a smaller number to a larger number of lanes or from a larger number to a smaller number of lanes. Longitudinal spacing of conveyor rods 18, and therefore pallets 20, may be adjusted by those skilled in the art to provide the desired interval of product progressing through system 10. The number of lanes provided by tracks 52a-52d and their transverse spacing may of course be adjusted by those skilled in the art. Flexibility is provided in the system by the programmability of the order and frequency of selection. Therefore, this system provides lane flexibility in an easily changeable format without requiring multiple conveyor lines which converge or diverge. Rather than requiring separate conveyors, this lane divider can be inserted in the system to multiplex or demultiplex a product stream.

Various modifications can be made to the present invention without departing from the apparent scope hereof.

We claim:

1. A system for dividing a flow of product from a conveyor system into multiple paths comprising:
   a. a frame;
   b. a driver mounted on the frame for continuous movement along a cyclic path from a first end of the frame longitudinally along a top side of the frame to a second end, down around the second end, back along a bottom of the frame, and upward to the top of the frame at the first end;
   c. transverse rods mounted on the driver for longitudinal movement along the path;
   d. at least one pallet for receiving product to be conveyed, the pallet slidably mounted on the rods for transverse movement across the rods while the pallet is carried along the path by the rods;
   e. multiple lane tracks mounted within the frame in a diverging pattern from a central point at the first end so that the tracks are spaced apart at the second end, the tracks being adapted for slidable engagement with the pallets; and,
   f. a pallet director mounted for movement among multiple positions corresponding to each of the tracks and for receiving pallets from the bottom side of the system and directing each pallet to one of the selected tracks at the central point as the pallet rises to the top of the system, said pallet director including an arcuate pallet path for directing each pallet to the top of the system, and said pallet director is pivotably mounted adjacent to the bottom side of the system for rotatable movement for operable connection to each of the selected tracks at the top of the system.

2. The system of claim 1 further including a controller programmable to multiple patterns of selection of the tracks.

3. A lane divider for dividing a flow of product from the conveyor system into multiple paths comprising:
   a. a plurality of pallets for bearing product;
   b. a drive system for moving the pallets from a first end of the divider along a generally flat top side to a second end for directing the pallets down around the second end, for returning the pallets to the first end along a bottom side, and for returning the pallets from the bottom side back to the top side at the first end;

c. multiple selectable tracks mounted along the top side for separating the pallets from a single path into multiple paths along the top side;

d. a pallet director pivotally mounted at the first end of the divider, the pallet director having a curved path for directing pallets from the bottom side of the divider to the top side of the divider and for selecting one of the tracks for each pallet, the pallet director having a bottom end mounted in position for receiving pallets returning on the bottom side and a top end adjustable to multiple positions corresponding to each of the tracks; and, e. a programmable pallet director selector for repetitively moving a pallet director through a pattern of the positions for selecting tracks.

4. The lane divider of claim 3 wherein the pallet director selector comprises:

a. a stepper motor;

b. director means connecting the stepper motor to the pallet director for moving the pallet director as the motor steps; and, c. a programmer for signaling a stepper motor to make proper steps for selecting a pattern of tracks.

5. The lane divider of claim 4 wherein the pallet director drive means comprises a cammed disk on the pallet director and a belt mounted on the cammed disk and the stepper motor for moving the pallet director as the motor steps.

* * * * *